Figure 1:
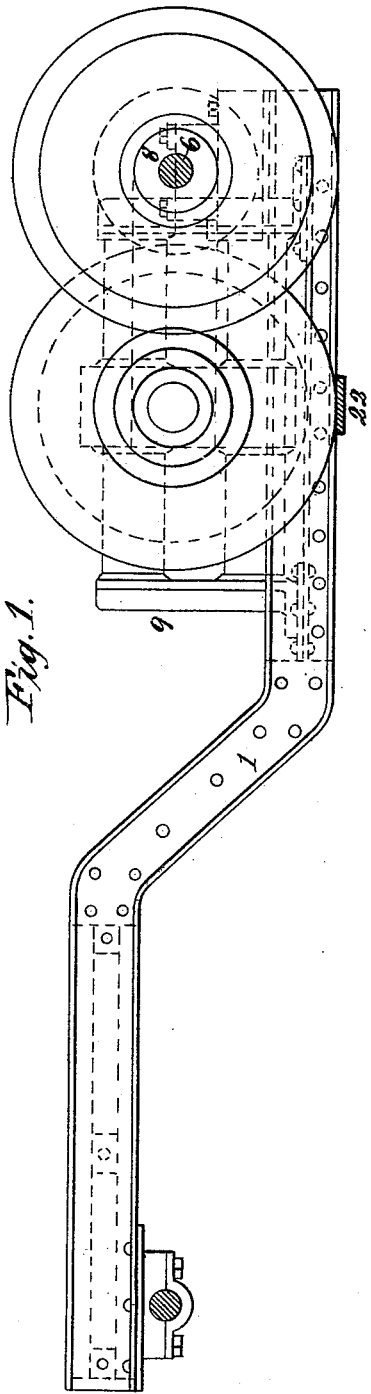

(No Model.) 3 Sheets—Sheet 1.

J. R. FINNEY.
ELECTRIC LOCOMOTOR.

No. 415,165. Patented Nov. 12, 1889.

ATTEST:
William H. Scott.
Harry L. Amer.

INVENTOR:
Joseph R. Finney
By his attys
Bakewell & Kerr (No Model.) 3 Sheets—Sheet 2.
J. R. FINNEY.
ELECTRIC LOCOMOTOR.
No. 415,165. Patented Nov. 12, 1889.
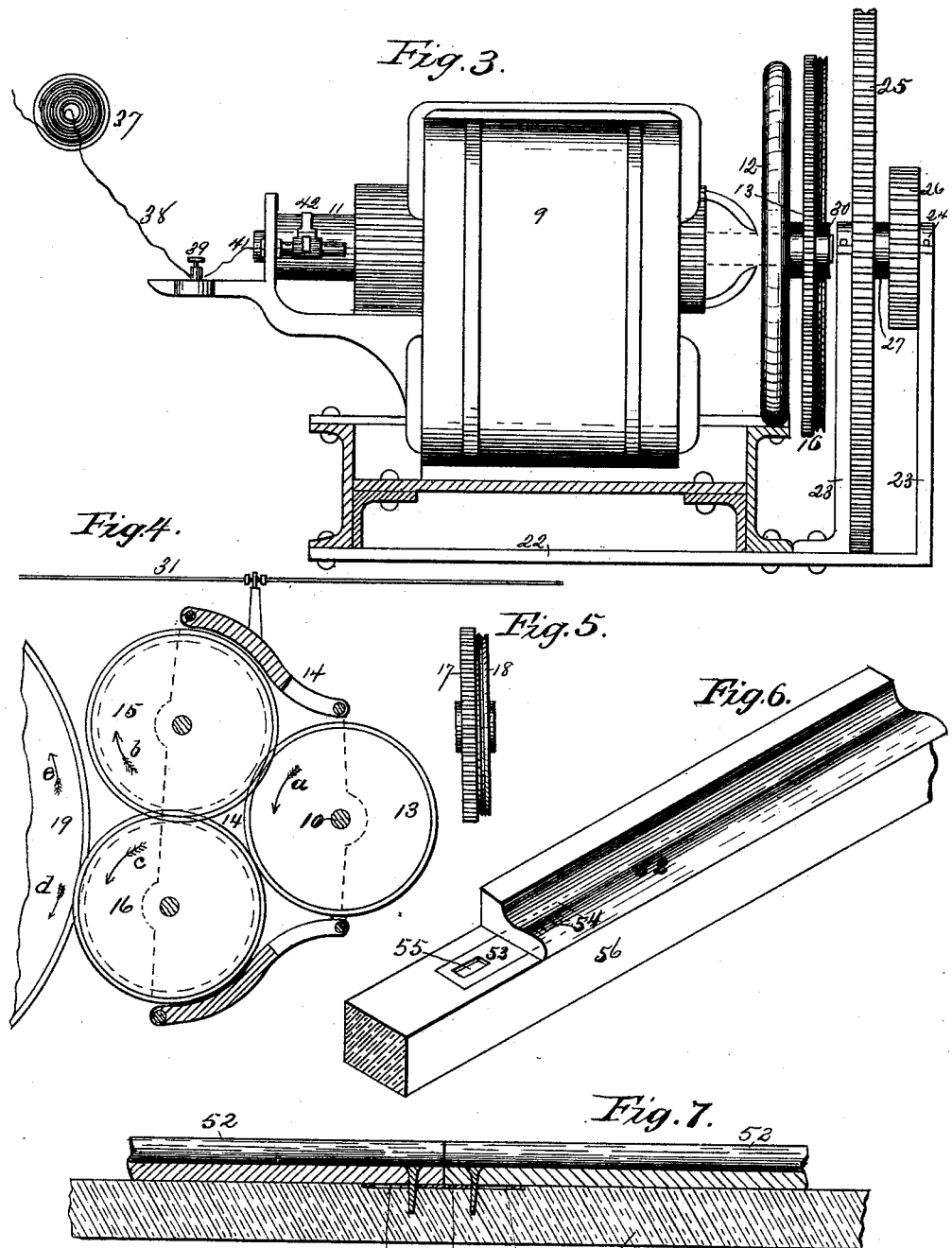
ATTEST—
William H. Scott
Harry L. Ames
INVENTOR—
Joseph R. Finney
By his attys
Bakewell & Kerr (No Model.) 3 Sheets—Sheet 3.

J. R. FINNEY.
ELECTRIC LOCOMOTOR.

No. 415,165. Patented Nov. 12, 1889.

ATTEST—
William H. Scott
Harry L. Amer

INVENTOR—
Joseph R. Finney
By his attys
Bakewell & Kerr

UNITED STATES PATENT OFFICE.

JOSEPH R. FINNEY, OF NATIONAL CITY, CALIFORNIA, ASSIGNOR, BY MESNE ASSIGNMENTS, OF ONE-HALF TO THE OVERHEAD CONDUCTOR ELECTRIC RAILWAY COMPANY, OF PITTSBURG, PENNSYLVANIA.

ELECTRIC LOCOMOTOR.

SPECIFICATION forming part of Letters Patent No. 415,165, dated November 12, 1889.

Application filed August 17, 1886. Serial No. 211,162. (No model.)

*To all whom it may concern:*

Be it known that I, JOSEPH R. FINNEY, of National City, in the county of San Diego and State of California, have invented a new and useful Improvement in Electric Locomotors; and I do hereby declare the following to be a full, clear, and exact description thereof, reference being had to the accompanying drawings, forming a part of this specification.

In operating electric locomotives I have found that if it is attempted to reverse the motor when the car is under headway there is great danger of burning out the insulation of the wire. In addition to this, there must be given to the commutator-brushes a certain definite lead, the direction of which is dependent upon the direction of rotation of the armature; otherwise the sparking at the brushes will injure or destroy the commutator. Whenever, therefore, the direction of rotation is changed, the brushes must be adjusted accordingly. This is a troublesome and difficult thing to do upon an electric locomotor, and to overcome both these difficulties I use a reversible friction-gear to communicate the power of the electric motor to the supporting traction or driving wheels of the car. By means of this friction-gear the car may be driven either forward or backward, while the motor itself revolves continuously at a practically uniform speed in one direction, except when a heavy load is thrown upon the motor the speed of the motor will necessarily be reduced. This, however, results in an increase of current flow in the motor, causing it to exert a corresponding increase of power. The friction-gear renders it possible to throw the motor into or out of connection with the traction-wheels while the former is being driven at any speed. It also enables the speed of the car to be graduated. The friction gear, also, may be used as a brake apparatus to check or stop the car.

I am aware that it has been proposed to employ electric motors with reversing toothed gears for driving mechanism in either direction without reversing the direction of motion of the armature of the motor. Whenever it is desired to reverse with such a construction, it is necessary first to stop the mechanism, as otherwise the gear-wheels cannot be brought into engagement, or, if they are brought into contact, the teeth are liable to be stripped and the connections destroyed. This is especially true in case of a heavy structure, such as a railway-car, which under the circumstances of use accumulates great momentum. The use of a reversible friction-gear upon such a vehicle is free from this objection, and, further, it permits of varying the speed of the vehicle without changing the speed of the motor, which cannot be accomplished by the use of toothed gear-wheels.

Figure 2:
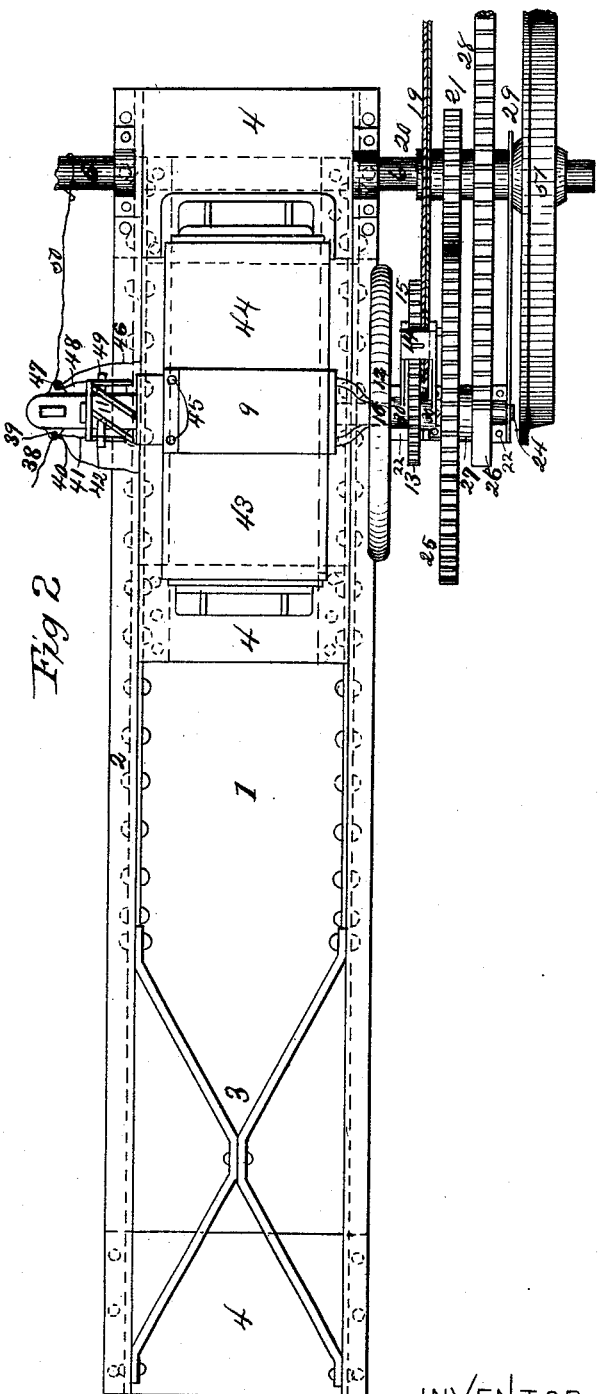
Figure 8:
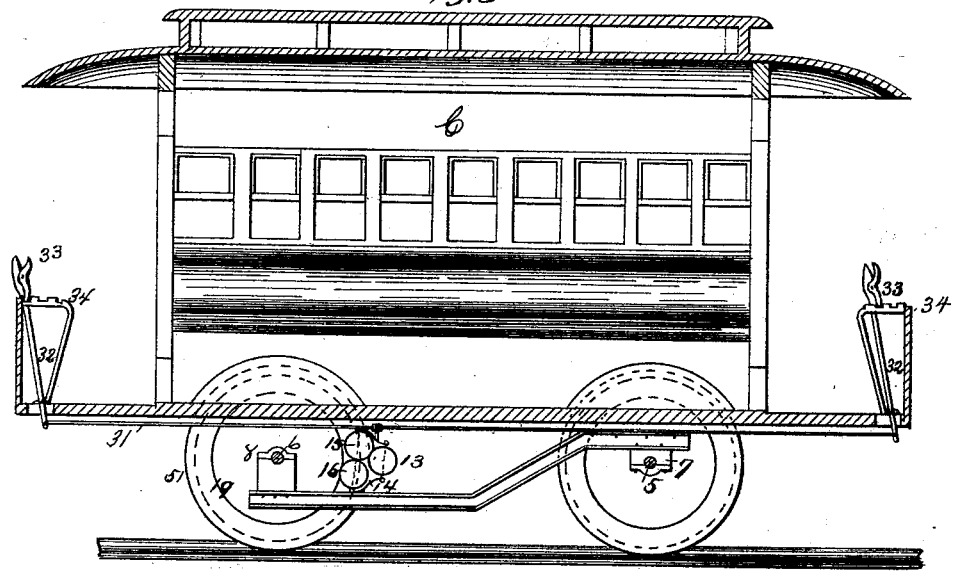
Figure 9:
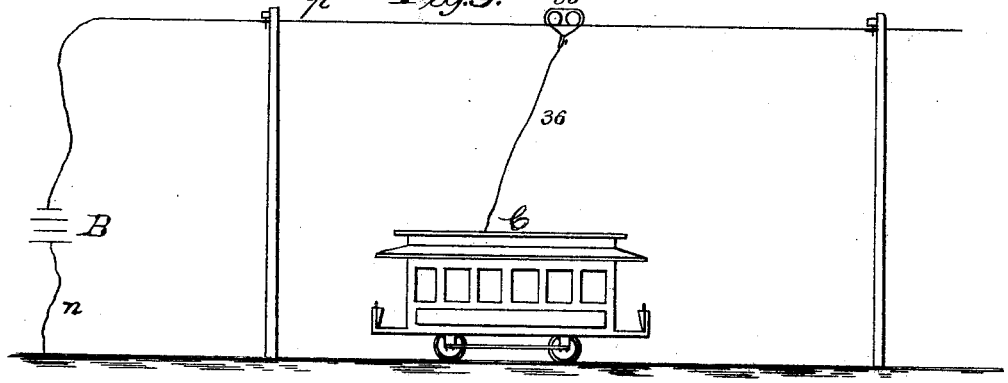

Figure 1 is a side elevation of the electromotor and of the truss which sustains it on the car-axles. Fig. 2 is a plan view of the same, showing also the power-connections between the motor-shaft and the car-axle. Fig. 3 is an end elevation of the motor and power-connections. Fig. 4 is a view of the reversing and braking wheels. Fig. 5 is an edge view of one of the compound gear and friction wheels. Figs. 6 and 7 show the means of securing electrical connection between the rails of the track. Fig. 8 is a side elevation of a car and of the reversing and braking apparatus. Fig. 9 is a diagram showing the main circuit.

Like letters of reference indicate like parts in each.

The truss 1 is formed of angle-iron bars 2, united by suitable braces 3 and plates 4. Thus I secure in the truss the requisite lightness and strength. The truss is mounted on the axles 5 6 by means of suitable bearing-boxes 7 8. The electromotor 9, which is of any desired and suitable construction, is secured on the truss so as to bring its shaft 10 on a level with the axle 6. The truss is made angling, so as to form a platform below the axle 6 for the motor, while its front end rests on top of the axle 5. The motor-shaft 10 is provided with a commutator 11 at one end and with a fly-wheel 12 at the other end. Outside of the fly-wheel is a small gear-wheel 13, which is secured rigidly to the shaft 10. Pivoted on the shaft 10 is a boxing or frame 14, on which are journaled two wheels 15 and 16. (See Fig. 4.) Each of these wheels is composed of two disks 17 and 18, the larger of which is a gear-wheel and the smaller a friction-wheel. (See Fig. 5.) The gear-wheel 13 meshes into the geared part 17 on the wheel 15, so that the wheel 13 drives the wheel 15 and the wheel 15 is in gear with and drives the wheel 16. The wheels 13 and 16 do not gear with each other. Loosely mounted on the axle 6 opposite to the friction-wheels 18 is a large friction-wheel 19, which is so placed that the friction-wheels 18 may be brought into driving-contact therewith, as hereinafter described, and as shown in Fig. 4. Secured to the friction-wheel 19 by a suitable sleeve 20 is a pinion 21, also loosely mounted on the axle 6.

Bolted to the under side of the truss 1 is a bar 22, the outer end of which sustains the upright standards or supports 23 of a short shaft 24, mounted loosely upon which is a large gear-wheel 25 and a pinion 26, which are secured together by a sleeve 27. The pinion 21 upon the axle 6 is in gear with the gear-wheel 25, and the pinion 26 on the shaft 24 is in gear with a large gear-wheel 28, mounted rigidly on the axle 6. The strap 29 extends from the shaft 24 to the axle 6, and prevents the shaft from being forced back from the axle when the power is applied to the gearing, and thus obviates danger of slack and disconnection of the wheels.

The frame 14 is pivoted by sleeves 30 on the shaft 10, and is capable of a radial movement thereon to throw the wheels 15 and 16 alternately into and out of contact with the friction-wheel 19. This movement is obtained by means of a rod 31, extending to the platforms on the opposite ends of the car, where it is connected to suitable levers 32, (see Fig. 8,) which are provided with pawls 33, operating in connection with the racks 34. These racks have a sufficient number of notches to permit the levers 32 to be fastened in such a position as will bring either of the wheels 15 or 16 into contact with the wheel 19, or an intermediate position, which will hold them out of contact therewith. The wheel 13 being in gear with the wheel 15 and the wheel 15 in gear with the wheel 16, both 15 and 16 are driven continuously in one direction by the wheel 13—that is to say, the wheel 13 being turned continuously in the direction of arrow $a$, causes the wheels 15 and 16 to be turned in the direction of arrows $b\ c$. Then when the wheel 16 is in contact with the wheel 19, as shown in Fig. 4, the wheel 19 is caused to turn in the direction of arrow $d$, and when the wheel 16 is thrown out of contact with the wheel 19 and the wheel 15 into contact therewith the wheel 19 will be caused to turn in the direction of arrow $e$. When the wheel 15 is in contact with the wheel 19, the wheel 16 revolves idly. The advantage of this arrangement is that the motor-shaft need not be reversed and the necessity of a pole-changer is obviated. This is a material point, for the reason that a pole-changer is a comparatively delicate device and liable to get out of order, and hence is not fitted for the rough usage of a railway. Further, the heating of the motor and the violent strain upon the motor-shaft caused by the reversing of the same is entirely obviated.

In place of a pole-changer, with its disadvantages, I have a mechanical device simple in its construction, certain in its action, and not liable to be damaged or put out of order by the rough usage of a railway. This device not only effects an almost instantaneous reversal of motion of the car-wheels, but affords a perfect brake, wherewith the car may be stopped with great ease. Little or no power is necessary to be exerted by the driver in operating the reversing and braking apparatus, because it is only necessary to throw the wheels 15 and 16 in contact with the wheel 19 to cause them to act efficiently, the draft of the wheels being sufficient to hold them in contact except in case of sudden and unusual jar, as when the car goes over a stone. The power of the motor-shaft, being applied to the wheel 19 in the manner described, is communicated to the car-axle through the pinion 21, to wheel 25, to pinion 26, to wheel 28, to the car-axle. This arrangement of gearing enables me to reduce the high speed of the motor-shaft 10 to the rate desired to be given to the car, and by the arrangement I have shown I am enabled to obtain this reduction of the speed, gaining power correspondingly, within the limited space between the motor-shaft 10 and the axle 6.

In Fig. 9 I show a general view of the main circuit. Here B indicates the battery or machine which is the source of power; $p$, the main wire, which is extended out on poles or other suitable support along the line of the railway-track, and $n$ the ground-wire. On the conductor $p$ is a traveling contact 35, of any suitable construction, from which the branch wire 36 extends to the car C, where it is connected to a spring-drum or other suitable adjusting device 37. The purpose of the drum is to allow for variations of distance between the car C and the main conductor $p$. From the axis of the drum a wire 38 extends to one of the binding-posts 39 of the motor.

In the particular form of motor shown in the drawings the circuit is as follows: Two wires 40 and 41 extend from the binding-post, one to the coils of the field-magnet and the other to one of the brushes 42 of the machine. The field-magnets 42 and 43 are electrically connected by a wire 45. A portion of the current passes over the wire 40 to magnet 42, thence by wire 45 to magnet 43, thence by wire 46 to the other binding-post 47. The balance of the current passes by wire 41 to the brush 42, thence to the commutator, thence through the armature-coils, and out by brush 49 and wire 48 to the binding-post 47, which is electrically connected with the axle 6 by means of the wire 50. The current then passes through the axle 6 and wheel 51 to the ground.

In order to insure a more perfect ground-connection, the rails 52, Figs. 6 and 7, are connected by a copper plate 53, placed under their adjoining ends and secured by rail-spikes 54, passing through slots 55 into the stringers 56. The plates 53 are slotted at 55 for the purpose of allowing for the expansion and contraction of the rails, which expansion and contraction, being always occurring, has a tendency to keep the plates bright and clear at their points of contact with the rails, and thus prevent oxidation or dirt from destroying the connection between the plates and the rails.

The ordinary iron fish-bars, shoes, and other devices used for connecting the ends of the rails will not answer for electrical connection, because the surface oxidizes and breaks the circuit. The same is also true where wires are used extending from the sides of the rails, because the surface of the iron rail which is in contact with the wire is liable to become oxidized and either totally or partially destroy the connection.

I have spoken of using three notches in the racks. They may, however, be used with intermediate notches, so as to apply the power partially. The use of the friction-faces enables the wheels to be thrown instantly into contact without danger, such as would occur with gear-wheels, where the teeth would be liable to be stripped. It also permits the wheels to slip, and so come gradually to the speed. The friction-disk 18 of the wheels 15 and 16 is of less diameter than the geared disk 17, to prevent the tongues of the friction-disks of the two wheels from binding or turning on each other. If desired, the wheel 13 may be a friction-wheel instead of a gear-wheel, and the parts 17 of the wheels 15 and 16 provided with friction instead of geared faces.

What I claim as my invention, and desire to secure by Letters Patent, is—

The combination, with the running-gear of a railway-car, of an electric driving-motor carried upon the car and a reversing friction-gear interposed between the motor-shaft and the wheels of the car, whereby the latter may be driven in either direction without reversing the direction of rotation of the motor-shaft, substantially as described.

In testimony whereof I have hereunto set my hand this 10th day of May, A. D. 1886.

JOSEPH R. FINNEY.

Witnesses:
CHAS. A. STARK,
JOHN G. STARK.